June 8, 1926.

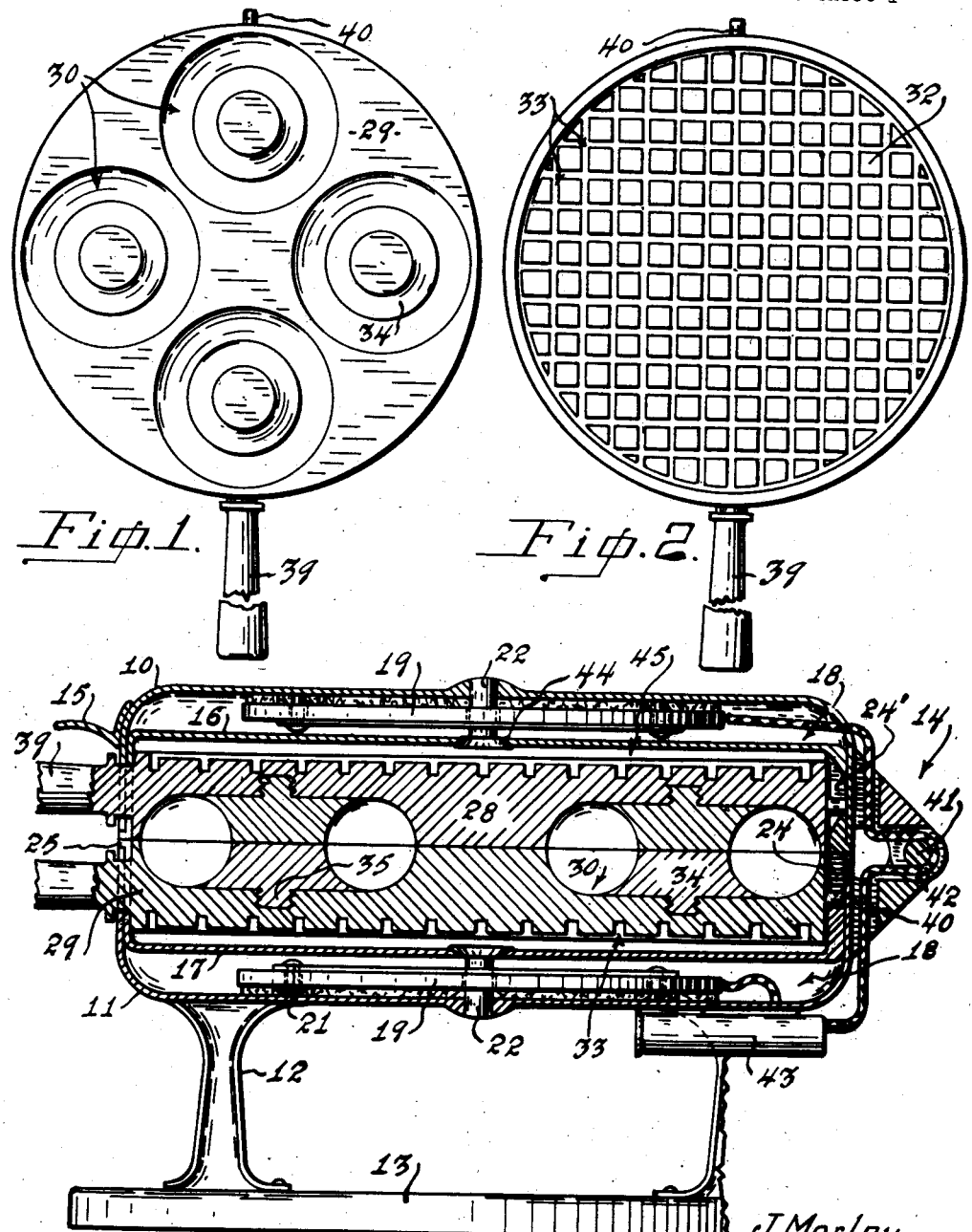

J. MORLEY 1,587,788

COOKING UTENSIL

Filed August 1, 1925    2 Sheets-Sheet 2

J. Morley
INVENTOR.

BY J W Sheely
ATTORNEY.

Patented June 8, 1926.

1,587,788

UNITED STATES PATENT OFFICE.

JOSEPH MORLEY, OF LOS ANGELES, CALIFORNIA.

COOKING UTENSIL.

Application filed August 1, 1925. Serial No. 47,444.

The present invention relates to cooking utensils of the multi-purpose type, and pertains more particularly to portable electric devices of the above mentioned character.

My invention has for its principal object the provision of a complete, self-contained utensil adapted for use in preparing numerous types and sizes of cakes and the like, including greaseless doughnut shaped cakes, waffles, cake layers, flat hot cakes, and the like.

Another object of the invention is to provide for quickly and conveniently adjusting contained parts of a device of the above mentioned character so that it may quickly be changed from one use to another.

Another object of the invention is to provide for employing an electric heating element in a device of the above character, while assuring even distribution of heat to the articles being cooked.

Still other objects of the invention include simplicity of construction and low cost consistent with the numerous uses to which the device is suited, and to further provide a neat and compact device adapted for use directly on a breakfast table.

I have illustrated by the accompanying drawings a typical embodiment of my invention, and in the said drawings;

Figure 1 is a plan view of a part hereinafter known as the combination mould.

Figure 2 is a bottom elevation thereof.

Figure 3 is a detail cross section of the complete utensil with all parts in place.

Figure 4:
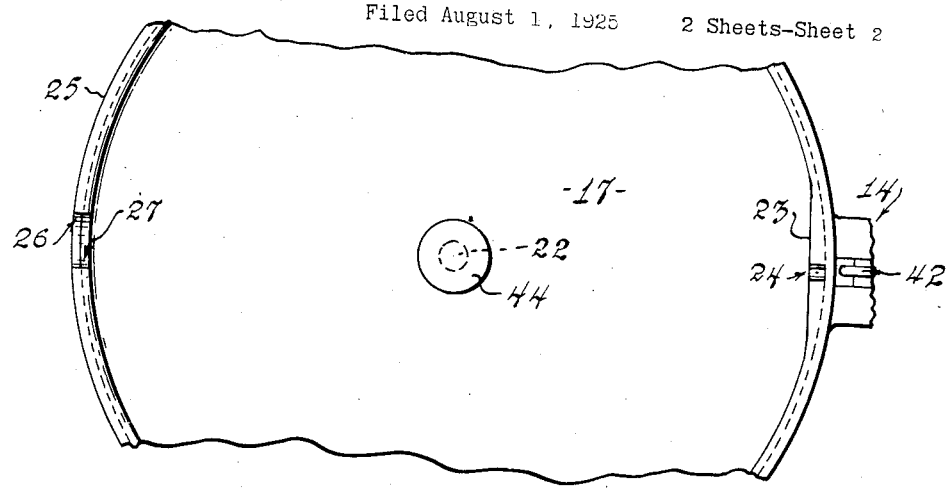
Figure 4 is a plan view of a part hereinafter known as the lower half of the utensil; the view showing the part as it appears with the corresponding combination mould removed.

In carrying out my invention in the embodiment illustrated I employ two cupped shell sections 10 and 11, respectively; the lower section 11 being provided with legs 12 securing it to a base 13. The upper section is hinged to the lower section by a hinge 14, and the upper section carries a small handle 15 by which it may be raised to open position. In closed position, as shown in Fig. 3, the shells register with each other and fully enclose contained parts. Each shell is provided with a more shallow dished member 16 and 17, respectively. Both dished members are substantially permanent parts and have a frictional fit in corresponding shell sections so that they may be removed, if necessary, for inspection or repair. Between each shell section and its corresponding dished member there remains a space 18.

The lower member 17 is known as the cake mould or pan, and is adapted for making layer cake sections, and the like, of full size. Below the cake pan there is provided an electric heating element 19, of any suitable type. Said element serves to heat the air space 18, the heat being transmitted to the cake pan both by radiation and by convection through the air. The heating element may be riveted to the lower shell section, as at 21. A stud 22 passes downward to the lower shell section and revolubly holds the cake pan in place above the heating element. The cake pan is thickened as at 23, and the rear is provided with a vertical slot 24.

The upper member 16 is similar to the cake pan and is held normally to the upper shell section. It will be apparent now that as both heating elements are energized, the respective members 16 and 17, together with the air spaces, will distribute the concentrated heat and prevent the contents of the cake pan from being subject to direct radiation from the heating element.

Obviously, the device, with the combination moulds removed, is well suited for baking a large cake or cake layer, by applying heat evenly to both sides thereof. In such form it is also suited for warming rolls and the like. Each of sections 16 and 17, respectively, are provided with flanges 25, overlying the shell sections and presenting smooth abutment surfaces to each other.

At the front of each shell section the metal is cut away in a U shaped portion, as at 26. The upper and lower members 16 and 17, respectively, are also cut away, as at 27, the openings so formed in each of the dished members being aligned normally with the corresponding openings so formed in the shell section. By turning the members 16 and 17, respectively, on respective studs, the openings may be moved out of registration with the corresponding openings in the shell so that the interior of the device is closed against escape of batter, dough, heat, etc.

There are provided two similar combination moulds 28 and 29, respectively, shown in Figs. 1 and 2. Each is substantially the same and each is adapted to fit closely in the corresponding one of the dished members, as shown in Fig. 3, so that they may be brought into contiguity with each other upon moving the shell sections into closed position. The upper surface 29, of a combination mould is provided with a plurality of annular depressions 30, of semicircular cross sections. By bringing corresponding surfaces of the two combination moulds into juxtaposition, the depressions provide doughnut shaped cavities adapted for cooking greaseless doughnut shaped cakes. All parts with which dough or batter are brought in contact are preferably made of aluminum or aluminum alloys so that greasing of the parts is not required and so that heat is evenly and quickly distributed to the articles being cooked.

The other surface 32, of each combination mould is provided with crossed grooves 33 so that the surfaces of the two moulds will act to provide a waffle iron. To change the device from a cooker of doughnut shaped cakes to a waffle iron the combination moulds are taken out of the shell sections and replaced in reversed position. A removable lug 34 is provided centrally of each doughnut shaped cavity. Said lug is provided with an externally threaded stud 35, partially cut away as at 36. The threaded stud is adapted to be screw threaded into a cavity 37 which is provided with interrupted threads, as at 38. A quarter turn of a lug will secure it in place or remove it. With the lugs removed, the cavities are adapted for baking muffins, gems, drop cakes and the like.

Each of the combination moulds is provided with a rigidly projecting horizontal handle by which the mould may be lifted and reversed. The handle is arranged to extend through the forward aligned openings provided in the corresponding pan and shell. At the rear of each combination mould there is provided a rearwardly projecting horizontal pin 40 adapted to enter the corresponding slot in members 16 and 17, respectively.

Figure 5:
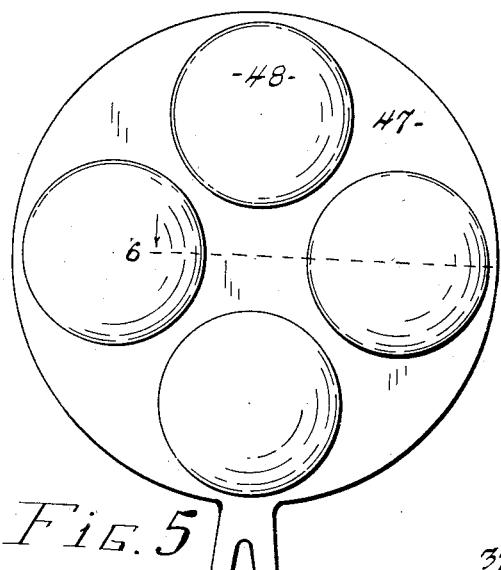
Figure 5 is a bottom elevation, in reduced scale, of an accessory of the device, known as the flat hot cake pan.
Figure 6:
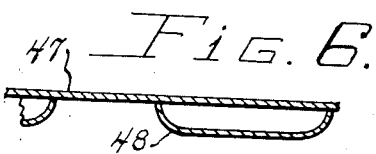
Figure 6 is a cross section thereof.
Figure 7:
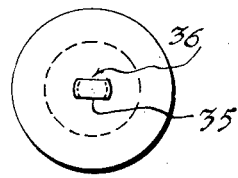
Figure 7 is a vertical section of a removable lug used on the combination mould.
Figure 8:
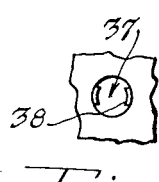
Figure 8 is a fragmentary plan of part of the mould illustrating a means for attaching the lug.

The flat hot cake pan shown in Figs. 5 and 6, includes a flat pan 47, to the underside of which are attached a plurality of cupped members 48. Said cupped members are adapted to fit in the corresponding cavities 30 of the lower mould section to center and hold the pan in proper position with regard to said section. This pan may be used as an accessory to the device where a flat cooking surface is required.

In the use and operation of the device for making greaseless doughnut shaped cakes, the annular depressions are placed uppermost. The lower mould is supported at the rear by the pin and at the front by the handle, so that its upper surface is flush with the upper surface of the lower pan 17. The axis of the handle and that of the pin are coincident and equidistant from the cooking surfaces of the mould section so that when the waffle forming surface is uppermost it will also register flush with the upper surface of the pan. The upper mould is supported at the rear end by the pin. The front end of the mould need not be supported in the shell since its weight holds it in place. To open the device, when it is being used for doughnut shaped cakes, waffles, muffins and the like, the handle of the upper mould is raised, thereby raising the shell, the upper pan 16, and the mould, together; all three being controlled in upward movement by the hinge. To remove the upper mould from the upper pan and shell, the handle on the upper shell section is grasped in one hand and the handle on the upper mould section is held by the other. Thus the upper mould may be parted from the upper pan and shell.

To quickly reverse the moulds the device is opened with upper parts laid back on a horizontal plane. By use of the handles the parts are easily reversed, whereupon the parts are moved to closed position. To insert batter or dough, the upper part need be raised less than ninety degrees, by lifting on the mould handle only.

In so far as distribution of heat is concerned, it will be seen that the heating element is in an air space and the heat therefrom must be conveyed through the air by convection and by radiation to the metal of the adjacent dished member, such as 16 and 17. By the time the heat reaches said pan it is fairly well distributed. With the moulds removed, the device is therefore suitable for baking and warming. For waffles, doughnut shaped cakes and the like, the heat is still more evenly distributed and applied. Either surface of the moulds presents sufficient depressions to considerably augment the area of the flat surface. In making doughnut shaped cakes or waffles, the heat must pass through the dished members by conduction, then through the next air space by convection and radiation, before reaching the inner surfaces of the aluminum moulds. The inner surfaces are so great in area the heat is readily picked up and conducted through the metal to the dough or batter lying on the upper surface. Thus the heat is well distributed, its passage from the heating element is slow but certain, and the net result is that the upper surfaces of the moulds are kept at an almost constant temperature, and objectionable temperature fluctuations are practically impossible.

Figure 9:
Figure 9 is a fragmentary view in front elevation partly in section of a modified form of the part hereinafter known as the upper shell section.

In the modified construction shown in Fig. 9, I provide a U shaped clip carried by the upper shell section and practically encompassing the opening 26. Said clip has its ends turned outwardly, as at 50, to provide for introducing the handle 39 to the clip. The construction of the clip is such that the handle, on being forced between the spaced ends 50, will expand the clip until said handle is in the position shown in Fig. 9. In this position the clip will hold the upper mould section in place so that the upper shell section may be raised solely by lifting the small handle 15.

It will be apparent now that I have provided a simple, efficient and highly useful cooking device adapted for a wide variety of uses, and well adapted to conserve and evenly distribute its heat and to maintain practically constant temperature, and while I have shown and described a specific embodiment of my invention, I do not limit myself to any specific construction or arrangement of parts and may alter same as I desire without enlarging the scope of my invention within the appended claims.

I claim:

1. In a cooking utensil, upper and lower cupped shell sections hinged to each other; cooking moulds one for each section and each adapted to fit removably in a corresponding cupped shell section; pins one projecting from the rear of each mould; handles one for each mould projecting from the corresponding mould at a point substantially diametrically opposed to the corresponding pin; each of the moulds having two opposed cooking surfaces; the shell sections each being provided with a substantially U shaped cut-away portion for receipt of the corresponding mould handle, and the shell sections each having an upwardly opening slot disposed diametrically opposite to the corresponding cut-away portion and adjacent the point where the shells are hinged to each other, and each corresponding handle and pin having their respective axes coincident and equidistant from the cooking surfaces of the corresponding mould.

2. In a cooking utensil, a pair of registerable moulds; each having a plurality of cavities adapted to register with corresponding cavities in the other mould, and a removable central plug in each cavity; said plugs adapted to register when the corresponding cavities are in registration, whereby the act of cooking dough in the registered cavities will provide an annular cake.

3. In a cooking utensil, a lower supported shell, a cooking mould in said shell presenting an upper horizontal cooking surface, a cupped upper shell hinged to the lower shell and arranged to be inverted over the lower shell coaxially therewith, a reversible cooking mould removably fitted in the upper cupped shell; said mould having upper and lower cooking surfaces respectively, a projection to the rear of the reversible cooking mould, an upwardly opening slot in said upper shell section disposed adjacent the point at which the shell sections are hinged for receipt of said pin; said slot arranged to hold the pin against descent beyond a predetermined point, a handle on said reversible mould diametrically disposed with regard to said pin; the pin and handle having their axes coincident and equidistant from the cooking surfaces of the said reversible mould, and the upper shell section, at a point diametrically opposed to the slot, having a downwardly opening substantially U shaped slot for receipt of the handle of the reversible cooking mould; whereby the upper shell section may be raised with the reversible cooking mould in place by the sole aid of the said handle.

4. In a cooking utensil, a cupped shell, a cupped pan fitting closely and coaxially in said shell; said pan being movable revolubly in said shell, a pivot for said pan carried coaxially of the shell; said pan spaced upwardly from said shell, a heating element in said shell under said pan, a circular removable cooking mould fitted in said pan, and a handle projecting horizontally from said mould; said pan and shell provided with registrable openings through which said handle passes; and said pan movable on its pivot to move said openings out of registration.

5. A cooking utensil, as in claim 4, in which the mould is reversible and provided with two cooking surfaces; each cooking surface provided with a plurality of cavities augmenting its normal heat receiving surface.

JOSEPH MORLEY.